(12) United States Patent
Bastide et al.

(10) Patent No.: US 10,447,646 B2
(45) Date of Patent: Oct. 15, 2019

(54) ONLINE COMMUNICATION MODELING AND ANALYSIS

(71) Applicant: International Business Machines Corporation, Armonk, NY (US)

(72) Inventors: Paul R. Bastide, Boxford, MA (US); Matthew E. Broomhall, Goffstown, NH (US); Aaron M. Cohen, Westford, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 14/739,404

(22) Filed: Jun. 15, 2015

(65) Prior Publication Data

US 2016/0366074 A1    Dec. 15, 2016

(51) Int. Cl.
  *H04L 12/58*   (2006.01)
  *H04L 12/24*   (2006.01)

(52) U.S. Cl.
  CPC .............. *H04L 51/34* (2013.01); *H04L 51/32* (2013.01); *H04L 41/5003* (2013.01); *H04L 41/5096* (2013.01)

(58) Field of Classification Search
  None
  See application file for complete search history.

(56) References Cited

U.S. PATENT DOCUMENTS

| | | | |
|---|---|---|---|
| 7,814,048 B2 | 10/2010 | Zhou et al. | |
| 8,332,477 B1 | 12/2012 | Kaiserlian et al. | |
| 8,495,147 B1 | 7/2013 | Lang et al. | |
| 9,336,282 B2 * | 5/2016 | Angulo | G06F 17/30864 |
| 2004/0163034 A1 * | 8/2004 | Colbath | G10L 15/28 |
| | | | 715/230 |
| 2010/0162135 A1 * | 6/2010 | Wanas | G06Q 10/10 |
| | | | 715/753 |
| 2012/0191716 A1 | 7/2012 | Omoigui | |

(Continued)

OTHER PUBLICATIONS

Apache Incubator, "ODFDOM—the OpenDocument API," Apache ODF Toolkit (incubating), 2011, p. 1-2, The Apache Software Foundation, http://incubator.apache.org/odftoolkit/odfdom/index.html, Accessed on: Feb. 9, 2015.

(Continued)

*Primary Examiner* — Joshua Joo
(74) *Attorney, Agent, or Firm* — Erik K. Johnson

(57) ABSTRACT

A method for modeling and analyzing online communications is provided. The method may include detecting at least one online conversation. The method may also include extracting a plurality of conversation elements associated with the at least one online conversation. The method may further include generating at least one conversation graph based on the extracted plurality of conversation elements. Additionally, the method may include analyzing the at least one generated conversation graph. The method may also include extracting a plurality of data associated with the at least one analyzed conversation graph. The method may further include sending the extracted plurality of data and the at least one analyzed conversation graph to one or more processing systems to present to at least one user.

12 Claims, 7 Drawing Sheets

(56) References Cited

U.S. PATENT DOCUMENTS

| | | | |
|---|---|---|---|
| 2014/0108322 A1 | 4/2014 | Buchanan et al. | |
| 2014/0244664 A1* | 8/2014 | Verma | G06Q 30/0251 707/749 |
| 2014/0297652 A1 | 10/2014 | Stevens et al. | |
| 2015/0234820 A1* | 8/2015 | Aravamudan | H04L 51/32 707/769 |
| 2016/0050176 A1* | 2/2016 | Norton | G06Q 10/00 709/206 |
| 2016/0117332 A1* | 4/2016 | Oztaskent | H04N 21/4782 707/725 |
| 2016/0239581 A1* | 8/2016 | Jaidka | G06F 17/30719 |
| 2016/0308988 A1* | 10/2016 | Koorakula | G06Q 50/01 |
| 2016/0342705 A1* | 11/2016 | Zheng | G06F 17/30958 |

OTHER PUBLICATIONS

Cogan et al., "Reconstruction and Analysis of Twitter Conversation Graphs," HotSocial'12, Aug. 2012, p. 25-31, ACM, Beijing, China.

Cong et al., "Finding Question-Answer Pairs from Online Forums," SIGIR'08, Jul. 20-24, 2008, p. 467-474, ACM, Singapore.

Dringus et al., "Using Data Mining as a Strategy for Assessing Asynchronous Discussion Forums," Computers & Education, 2005, p. 141-160, vol. 45, Science Direct, Elsevier Ltd.

Elsas et al., "It Pays to be Picky: An Evaluation of Thread Retrieval in Online Forums," SIGIR'09, Jul. 19-23, 2009, p. 714-715, ACM, Boston, Massachusetts, USA.

IBM, "Analyzing survey text: a brief overview," IBM Business Analytics Software, May 2010, p. 1-11, IBM Corporation.

IBM, "IBM SPSS Statistics Editions," IBM Business Analytics Software, Apr. 2013, p. 1-7, IBM Corporation.

Joty et al., "Unsupervised Modeling of Dialog Acts in Asynchronous Conversations," Proceedings of the Twenty-Second International Joint Conference on Artificial Intelligence, Jul. 16-22, 2011, p. 1807-1813, AAAI Press, Spain.

Mell et al., "The NIST Definition of Cloud Computing," National Institute of Standards and Technology, Sep. 2011, p. 1-3, Special Publication 800-145.

Microsoft, "Microsoft Office—Tools to Get Work Done," Welcome to Office, 2015, p. 1-3, https://products.office.com/en-US/, Accessed on: Feb. 9, 2015.

Oliver et al., "Apache POI—the Java API for Microsoft Documents," The Apache POI Project, Last Updated on Dec. 21, 2014, p. 1-2, The Apache Software Foundation, http://poi.apache.org/index.html, Accessed on: Feb. 9, 2015.

Oracle, "Oracle Outside in Technology," Oracle Fusion Middleware, 2014, p. 1-3.

Wikipedia, "Natural language processing," Wikipedia: the Free Encyclopedia, Last Modified on Feb. 7, 2015, p. 1-10, http://en.wikipedia.org/wiki/Natural_language_processing, Accessed on: Feb. 9, 2015.

\* cited by examiner

ONLINE COMMUNICATION MODELING AND ANALYSIS

BACKGROUND

The present invention relates generally to the field of computing, and more specifically, to online communication.

Generally, online communication tools enable the sharing and processing of information between users. Forums, chat rooms, social networks, instant messaging, and email programs are some of the online communication tools used to connect users to information. For example, users may interact by posting comments to forums, sending email messages, and posting statuses and comments on social media websites. In turn, online conversations between users may develop and grow as users reply to the initiated interactions and the comments and replies increase. Typically, these online conversations that include different posts between users are treated as one document, or individual pieces of information.

SUMMARY

A method for modeling and analyzing online communications is provided. The method may include detecting at least one online conversation. The method may also include extracting a plurality of conversation elements associated with the at least one online conversation. The method may further include generating at least one conversation graph based on the extracted plurality of conversation elements. Additionally, the method may include analyzing the at least one generated conversation graph. The method may also include extracting a plurality of data associated with the at least one analyzed conversation graph. The method may further include sending the extracted plurality of data and the at least one analyzed conversation graph to one or more processing systems to present to at least one user.

A computer system for modeling and analyzing online communications is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting at least one online conversation. The method may also include extracting a plurality of conversation elements associated with the at least one online conversation. The method may further include generating at least one conversation graph based on the extracted plurality of conversation elements. Additionally, the method may include analyzing the at least one generated conversation graph. The method may also include extracting a plurality of data associated with the at least one analyzed conversation graph. The method may further include sending the extracted plurality of data and the at least one analyzed conversation graph to one or more processing systems to present to at least one user.

A computer program product for modeling and analyzing online communications is provided. The computer program product may include one or more computer-readable storage devices and program instructions stored on at least one of the one or more tangible storage devices, the program instructions executable by a processor. The computer program product may include program instructions to detect at least one online conversation. The computer program product may also include program instructions to extract a plurality of conversation elements associated with the at least one online conversation. The computer program product may further include program instructions to generate at least one conversation graph based on the extracted plurality of conversation elements. Additionally, the computer program product may include program instructions to analyze the at least one generated conversation graph. The computer program product may also include program instructions to extract a plurality of data associated with the at least one analyzed conversation graph. The computer program product may further include program instructions to send the extracted plurality of data and the at least one analyzed conversation graph to one or more processing systems to present to at least one user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
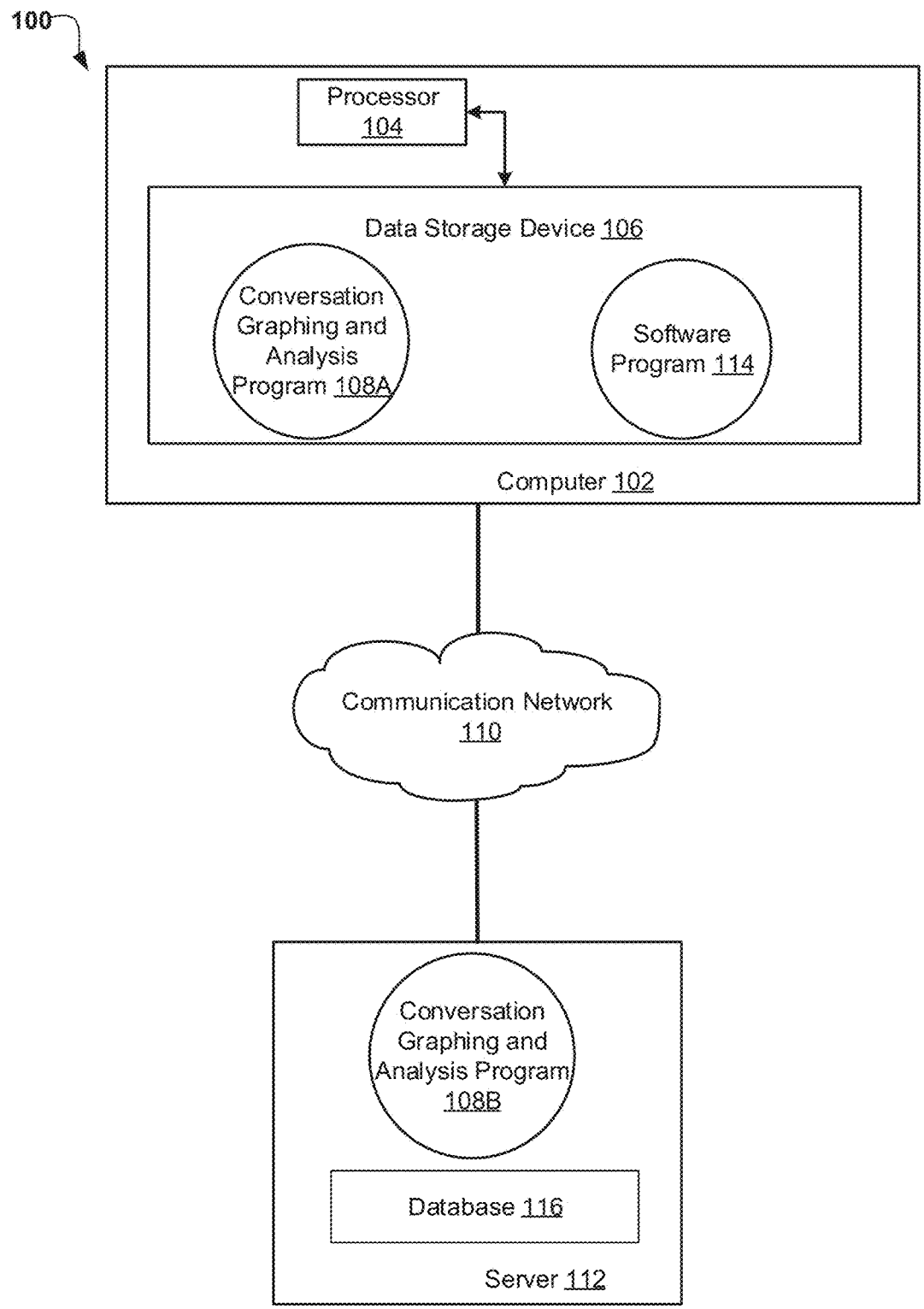
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to online communication. The following described exemplary embodiments provide a system, method and program product for modeling and analyzing conversation-based online communications. Therefore, the present embodiment has the capacity to improve the technical field of online communication by structuring elements of conversations for understanding and analysis. Specifically, the present embodiment may extract conversation elements associated with online communication applications, and generate conversation graphs based on the conversation elements.

As previously described with respect to online communications, users may interact using online communication applications such as posting comments to forums, sending emails, and posting statuses and comments on social media. Furthermore, as users reply to initiated interactions and the posts/comments increase, lengthy online conversations may be generated. However, these online conversations are treated as one document on a page, or individual pieces of information on a page, that include incoherent sets of information. For example, users may post about topics to online communication tools such as a forum. Specifically, interactions may be initiated on a forum whereby users are posting different questions and comments about the topic, and different users are replying with different questions and comments. Furthermore, the questions and comments are incoherently listed on the forum page such that a complex series of conversations are generated. Thus, it may be difficult for users to understand and follow the complex series of conversations, and to identify information related to the questions posted. As such, it may be advantageous, among other things, to provide a system, method and program product for modeling and analyzing conversation-based online communications, and more specifically, to extracting conversation elements associated with online communication applications and generating conversation graphs based on the conversation elements.

According to at least one implementation of the present embodiment, online conversations initiated on online communication applications may be detected. Next, conversation elements associated with the online conversations may be identified and extracted. Then, conversation graphs based on the extracted conversation elements may be generated. Furthermore, the generated conversation graphs may be analyzed. Thereafter, subsets of information associated with the analyzed conversation graphs may be weighted and summarized. Next, the subsets of information may be presented to users through processing systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for modeling and analyzing conversation based online communications.

According to at least one implementation, at least one modification to a computer file and the referenced file path associated with the computer file may be detected. Then, the type of modification applied to the computer file may be identified. Next, based on the identified modification, at least one generated target file path associated with the computer file may be identified. Thereafter, the at least one generated target file path may be synchronized with the referenced file path associated with the computer file. Next, based on the synchronization, the file path information associated with the computer file may be modified. Then, an association tab may be generated in the file properties of the synchronized file paths associated with the computer file. Thereafter, the file path information associated with the computer file may be validated and extracted for use by applications and programs.

Referring now to FIG. 1, an exemplary networked computer environment 100 in accordance with one embodiment is depicted. The networked computer environment 100 may include a computer 102 with a processor 104 and a data storage device 106 that is enabled to run a conversation graphing and analysis program 108A and a software program 114. The software program 114 may be an application program such as an internet browser and an email program. The conversation graphing and analysis program 108A may communicate with the software program 114. The networked computer environment 100 may also include a server 112 that is enabled to run a conversation graphing and analysis program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 5, server computer 112 may include internal components 800a and external components 900a, respectively and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the conversation graphing and analysis program 108A, 108B may interact with a database 116 that may be embedded in various storage devices, such as, but not limited to a mobile device 102, a networked server 112, or a cloud storage service.

According to the present embodiment, a program, such as a conversation graphing and analysis program 108A and 108B may run on the client computer 102 or on the server computer 112 via a communications network 110. The conversation graphing and analysis program 108A, 108B may model and analyze conversation based online communications. Specifically, a user using a computer, such as computer 102, may run a conversation graphing and analysis program 108A, 108B, that interacts with a software program 114, such as Firefox® (Firefox and all Firefox-based trademarks and logos are trademarks or registered trademarks of Firefox and/or its affiliates) to extract conversation elements associated with conversation based on online communications, construct graphs based on the extracted conversation elements, and analyze the constructed graphs to present to users.

Figure 2:
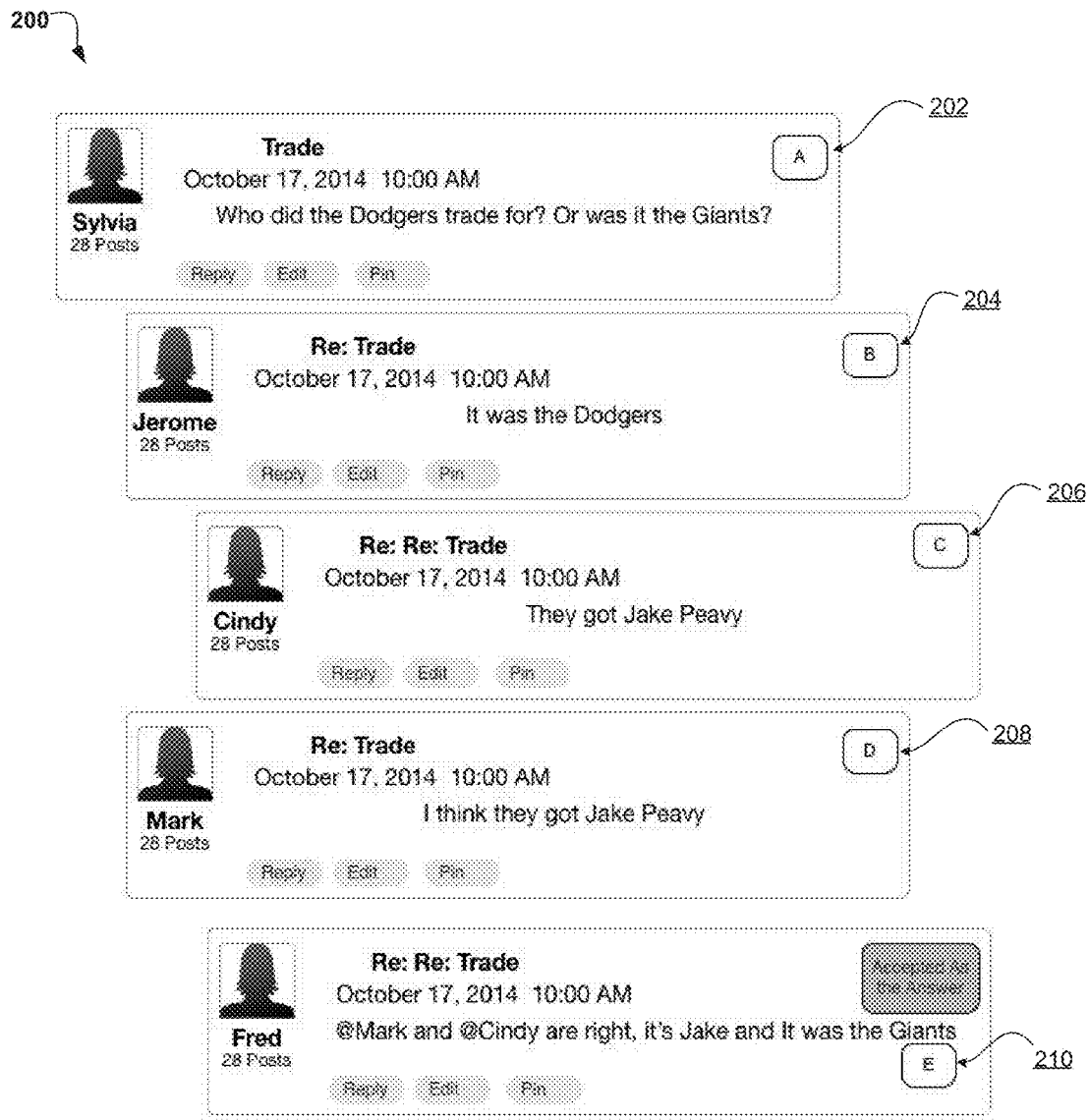
FIG. 2 is an example of an online communication application according to one embodiment.

Referring now to FIG. 2, an example of an online communication application 200 in accordance with one embodiment is depicted. As previously described in FIG. 1, the conversation graphing and analysis program 108A, 108B (FIG. 1) may detect conversations initiated on online communication applications 200. For example, the conversation graphing and analysis program 108A, 108B (FIG. 1) may detect online communications such as email messages, social networking interactions, instant messages, and forum and wiki postings. Therefore, in FIG. 2, the conversation graphing and analysis program 108A, 108B (FIG. 1) may detect conversations initiated by users using an online communication application 200, such as a forum, about a topic, such as a baseball trade. Thus, in post "A" 202, a user may initiate a conversation on a forum whereby the user asks a question about a baseball topic. Furthermore, the following posts, "B" 204, "C" 206, "D" 208, and "E" 210 may be replies and comments to the initial post "A" 202, whereby post "E" 210 may be labeled the accepted answer by the online communication application 200.

Figure 3:
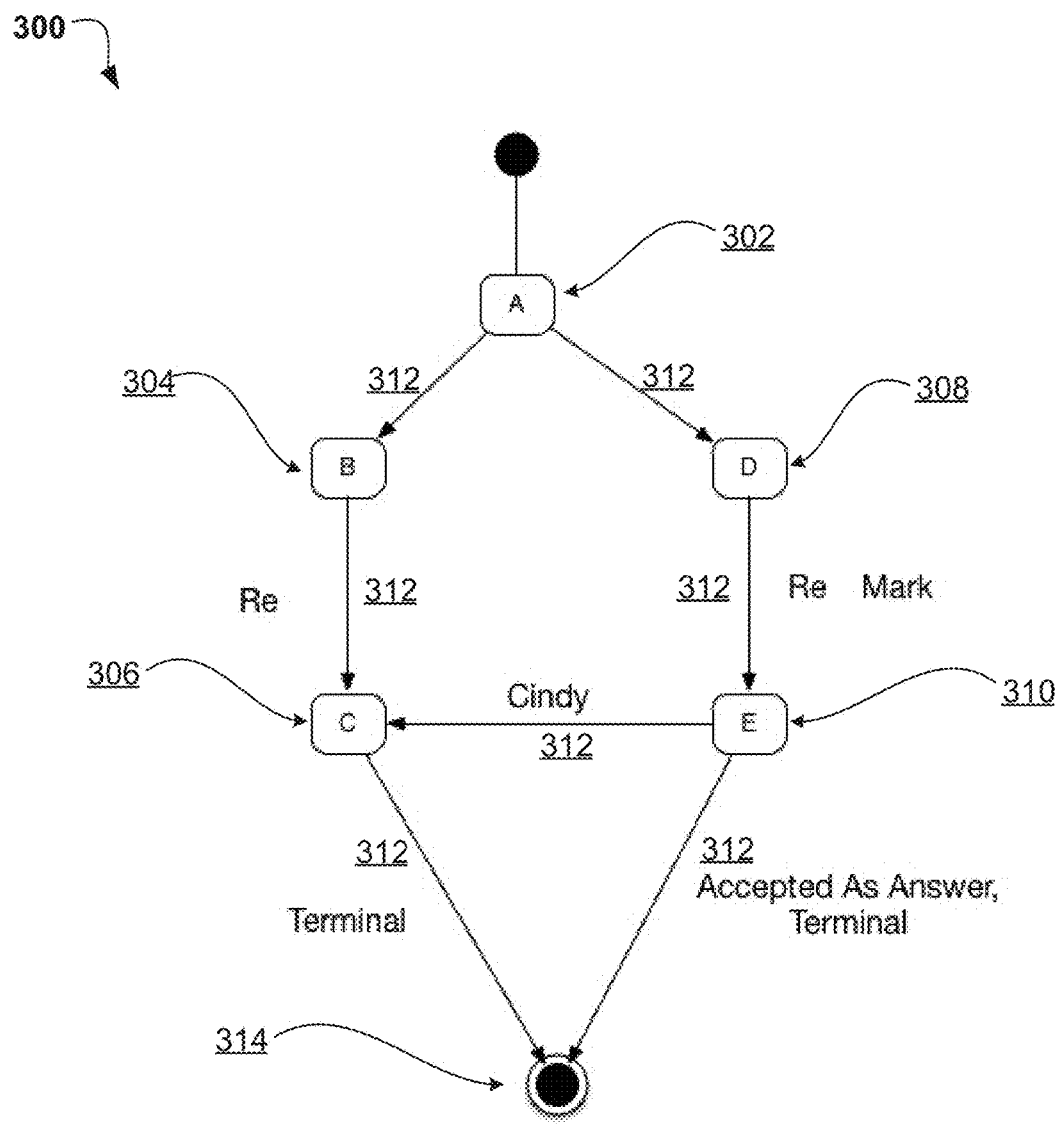
FIG. 3 is block diagram illustrative of an example of a conversation graph for modeling and analyzing online communications according to one embodiment.

Referring now to FIG. 3, an example of a conversation graph 300 in accordance with one embodiment of the present invention is depicted. As previously described in FIG. 2, the conversation graphing and analysis program 108A, 108B (FIG. 1) may detect conversations initiated on online communication applications 200 (FIG. 2). As such, the conversation graphing and analysis program 108A, 108B (FIG. 1) may extract the conversation elements associated with a given conversation and construct a conversation graph 300 based on the extracted conversation elements. For example, the conversation graphing and analysis program 108A, 108B (FIG. 1) may extract the conversation elements associated with the conversation in FIG. 2. Specifically, the conversation graphing and analysis program 108A, 108B (FIG. 1) may extract conversation elements such as the posts "A" 302, "B" 304, "C" 306, "D" 308, and "E" 310, and the post data 312, such as post "C" 306 is a reply to post "B" 304, to construct the conversation graph 300. As such, the posts 302, 304, 306, 308, and 310 may form the vertices of the conversation graph 300, and the post data 312 may form the edges of the conversation graph 300.

Figure 4:
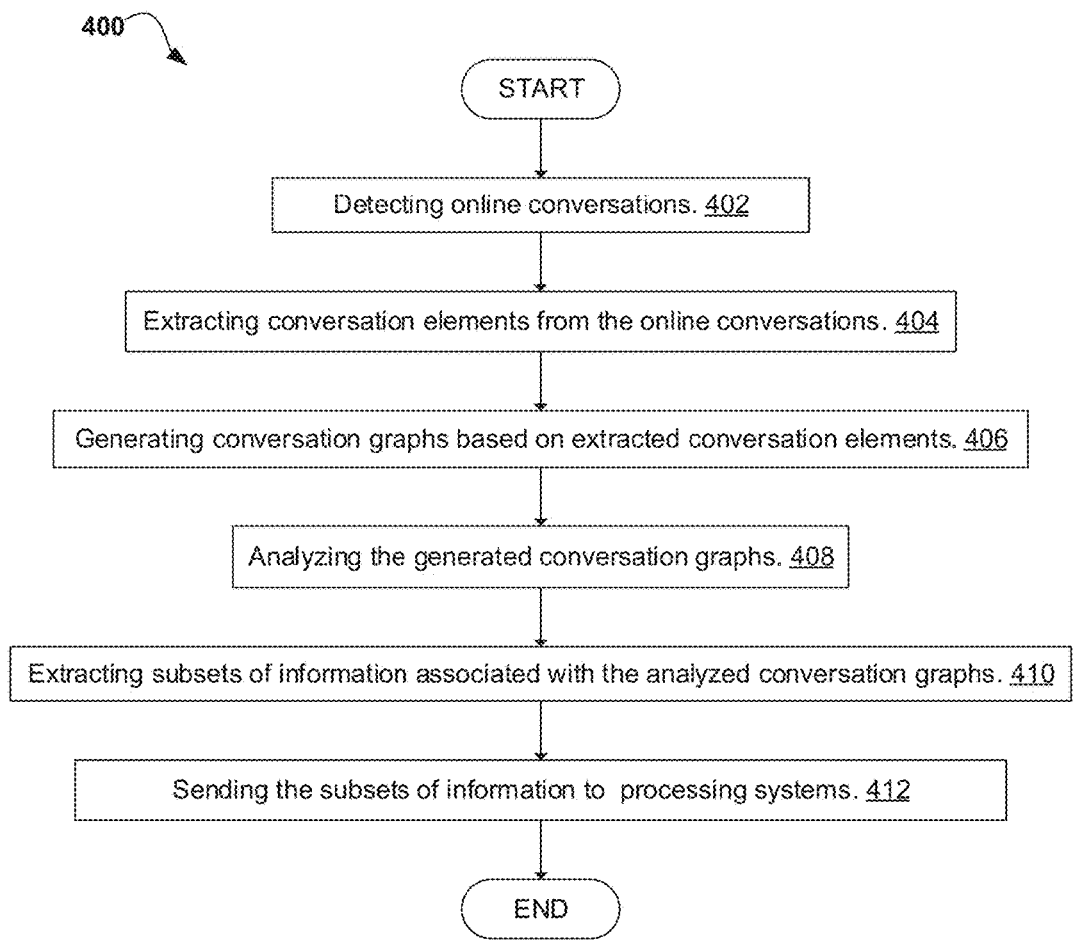
FIG. 4 is an operational flowchart illustrating the steps carried out by a program for modeling and analyzing online communications according to one embodiment.

Referring now to FIG. 4, an operational flowchart 400 illustrating the steps carried out by a program for modeling and analyzing conversation-based online communications is depicted. At 402, the conversation graphing and analysis program 108A, 108B (FIG. 1) may detect online conversations. Specifically, the conversation graphing and analysis program 108A, 108B (FIG. 1) may detect online conversations initiated on online communication applications such as email programs, social networking applications, instant messaging applications, forums, and wikis. Therefore, the conversation graphing and analysis program 108A, 108B (FIG. 1) may monitor and detect online conversations related to one or more topics. For example, for Compliance and Governance Service Provider Interfaces, the conversation graphing and analysis program 108A, 108B (FIG. 1) may detect each 'create-update-delete' event about a given topic in an activity stream, and send an event/notification based on the event. Furthermore, the conversation graphing and analysis program 108A, 108B (FIG. 1) may monitor and detect messages associated with one or more topics on an email program such as IBM Notes® (IBM Notes and all IBM Notes-based trademarks and logos are trademarks or registered trademarks of IBM and/or its affiliates), and detect incoming web sessions for HTTP Method-related conversations on web applications such as IBM Connections® (IBM Connections and all IBM Connections-based trademarks and logos are trademarks or registered trademarks of IBM and/or its affiliates).

For example, as previously described in FIG. 2, the conversation graphing and analysis program 108A, 108B (FIG. 1) may detect conversations by users using an online communication application 200 (FIG. 2), such as a forum, about a topic, such as a baseball trade. Thus, the conversation graphing and analysis program 108A, 108B (FIG. 1) may detect a user initiating a conversation on the forum by posting "A" 202 (FIG. 2), whereby the user asks a question about a baseball topic. Thereafter, the conversation graphing and analysis program 108A, 108B (FIG. 1) may detect comments and replies in posts "B" 204 (FIG. 2), "C" 206 (FIG. 2), "D" 208 (FIG. 2), and "E" 210 (FIG. 2), whereby post "E" 210 (FIG. 2) may be labeled the accepted answer by the online communication application 200.

Then, at 404, the conversation graphing and analysis program 108A, 108B (FIG. 1) may extract conversation elements from the initiated online conversations. As previously described at step 402, the conversation graphing and analysis program 108A, 108B (FIG. 1) may detect conversations initiated on online communication applications such as email programs, social networking applications, instant messaging applications, forums, and wikis. For example, and as previously described in step 402, the conversation graphing and analysis program 108A, 108B (FIG. 1) may detect comments and replies such as posts "A" 202 (FIG. 2), "B" 204 (FIG. 2), "C" 206 (FIG. 2), "D" 208 (FIG. 2), and "E" 210 (FIG. 2), that are initiated on a forum. Therefore, based on the detected comments and replies, the conversation graphing and analysis program 108A, 108B (FIG. 1) may extract the conversation elements from the comments and replies. Thus, according to one implementation, the conversation graphing and analysis program 108A, 108B (FIG. 1) may extract conversation elements such as routing data (that may include mime data, activity stream data, correlation identifiers, reply-to data), social data (that may @mentions, crowd sourced data, marked as helpful, marked as an answer), meta data (that may include likes and tags), and message body (that may include the body of messages, forwards and replies).

Next, at 406, the conversation graphing and analysis program 108A, 108B (FIG. 1) may generate conversation graphs 300 (FIG. 3) based on the extracted conversation elements. As previously described in step 404, the conversation graphing and analysis program 108A, 108B (FIG. 1) may extract conversation elements from the online conversations initiated on online communication applications 200 (FIG. 2). Thereafter, the conversation graphing and analysis program 108A, 108B (FIG. 1) may generate conversation graphs 300 (FIG. 3) based on the extracted conversation elements to organize and model the online conversations efficiently.

For example, and as previously described in FIG. 3, the conversation graphing and analysis program 108A, 108B (FIG. 1) may extract conversation elements such as the posts "A" 302 (FIG. 3), "B" 304 (FIG. 3), "C" 306 (FIG. 3), "D" 308 (FIG. 3), and "E" 310 (FIG. 3), as well as post data 312 (FIG. 3). For example, the post data 312 (FIG. 3) may include routing data to indicate that post "B" 304 (FIG. 3) is a reply to post "A" 302 (FIG. 3). As such, the posts 302, 304, 306, 308, and 310 (FIG. 3) may form the vertices of the conversation graph 300 (FIG. 3), and the post data 312 (FIG. 3) may form the directed edges of the conversation graph 300 (FIG. 3). Therefore, the conversation graphing and analysis program 108A, 108B (FIG. 1) may position the initial post "A" 302 (FIG. 3) atop the conversation graph 300 (FIG. 3). Then, post "B" 304 (FIG. 3) and post "D" 308 (FIG. 3) may be direct replies to post "A" 302 (FIG. 3), and thus, may be presented thereafter on the vertices of the conversation graph 300 (FIG. 3). Next, post "C" 306 (FIG. 3) may be a reply to post "B" 304 (FIG. 3), and post "E" 310 (FIG. 3) may be a reply to both post "D" 308 (FIG. 3) and post "C" 306 (FIG. 3), and thus represented on the conversation graph accordingly in FIG. 3. Then, the conversation graphing and analysis program 108A, 108B (FIG. 1) may end the conversation graph with the determined answer/terminal post 314 (FIG. 3).

Then, at 408, the conversation graphing and analysis program 108A, 108B (FIG. 1) may analyze the generated conversation graphs. As previously described in step 406, the conversation graphing and analysis program 108A, 108B (FIG. 1) may generate conversation graphs 300 (FIG. 3) based on the extracted conversation elements to organize and model the online conversations efficiently. Furthermore, the conversation graphing and analysis program 108A, 108B (FIG. 1) may analyze the generated conversation graphs 300 (FIG. 3) by selecting conversation paths and determining the benefit of each conversation path. Specifically, the conversation graphing and analysis program 108A, 108B (FIG. 1) may select and rate the conversation paths associated with the generated conversation graphs to determine the conversation paths having the maximum benefit to attaining accurate information and results.

For example, the conversation graphing and analysis program 108A, 108B (FIG. 1) may analyze the conversation graph 300 in FIG. 3 by selecting one or more conversation paths. Specifically, based on the conversation graph 300 (FIG. 3), the conversation graphing and analysis program 108A, 108B (FIG. 1) may select 3 conversation paths such as: SET1 {A→D→E→Terminal}, SET2 {A→D→E→C-→Terminal}, and SET3 {A→B→C→Terminal}. Furthermore, the conversation graphing and analysis program 108A, 108B (FIG. 1) may rate each conversation path [SET1, SET2, SET3] to determine the conversation path having the maximum benefit to attaining accurate information and results about a given topic. Specifically, the conversation graphing and analysis program 108A, 108B (FIG. 1) may rate the conversation paths using factors such as, but not limited to, the popularity of the posts (likes and tags), the number of views, and the length of the conversation path file. As such, based on the weighted factors, the conversation graphing and analysis program 108A, 108B (FIG. 1) may determine that SET1 has the highest benefit to attaining accurate information and results, SET2 is less beneficial, and SET3 is the least beneficial.

Next, at 410, the conversation graphing and analysis program 108A, 108B (FIG. 1) may extract subsets of information associated with the analyzed conversation graphs 300 (FIG. 3). As previously described in step 408, the conversation graphing and analysis program 108A, 108B (FIG. 1) may analyze the generated conversation graphs 300 (FIG. 3) by selecting conversation paths and determining the benefit of each conversation path. As such, the conversation graphing and analysis program 108A, 108B (FIG. 1) may extract subsets of information based on the selection and determination of the conversation paths. Specifically, the subsets of information extracted by the conversation graphing and analysis program 108A, 108B (FIG. 1) may be information associated with one or more conversation paths that are selected and determined to have the benefit of attaining accurate information and results for one or more given topics. For example, as previously described in step 408, the conversation graphing and analysis program 108A, 108B (FIG. 1) may determine that SET1 has the highest benefit to attaining accurate information and results about a given topic. Therefore, the conversation graphing and analysis program 108A, 108B (FIG. 1) may extract the information associated with SET1.

Then, at 412, the conversation graphing and analysis program 108A, 108B (FIG. 1) may send the extracted subsets of information to one or more processing systems. For example, the conversation graphing and analysis program 108A, 108B (FIG. 1) may extract subsets of information based on the selected conversation paths, as previously described in steps 408 and 410, and then send the subsets of information to a processing system such as IBM Watson® (IBM Watson and all IBM Watson-based trademarks and logos are trademarks or registered trademarks of IBM and/or its affiliates) to present to users.

It may be appreciated that FIGS. 2-4 provide only an illustration of one implementation and does not imply any limitations with regard to how different embodiments may be implemented. Many modifications to the depicted environments may be made based on design and implementation requirements. For example, in step 406 (FIG. 4), for generating the conversation graphs based on the extracted elements, the conversation graphing and analysis program 108A, 108B (FIG. 1) may split the messages/posts that span over one paragraph into smaller segments for a greater detailed model. Furthermore, the conversation graphing and analysis program 108A, 108B (FIG. 1) may limit the size of the conversation graph to a set time period, such as 6 hours, 12 hours, and/or 1 day. Also, the conversation graphing and analysis program 108A, 108B (FIG. 1) may implement similarity detection to detect similar posts and generate additional analytical data based the detection of the similar post. Additionally, the conversation graphing and analysis program 108A, 108B (FIG. 1) may implement a lookup table that has lookup and mapping capabilities.

Figure 5:
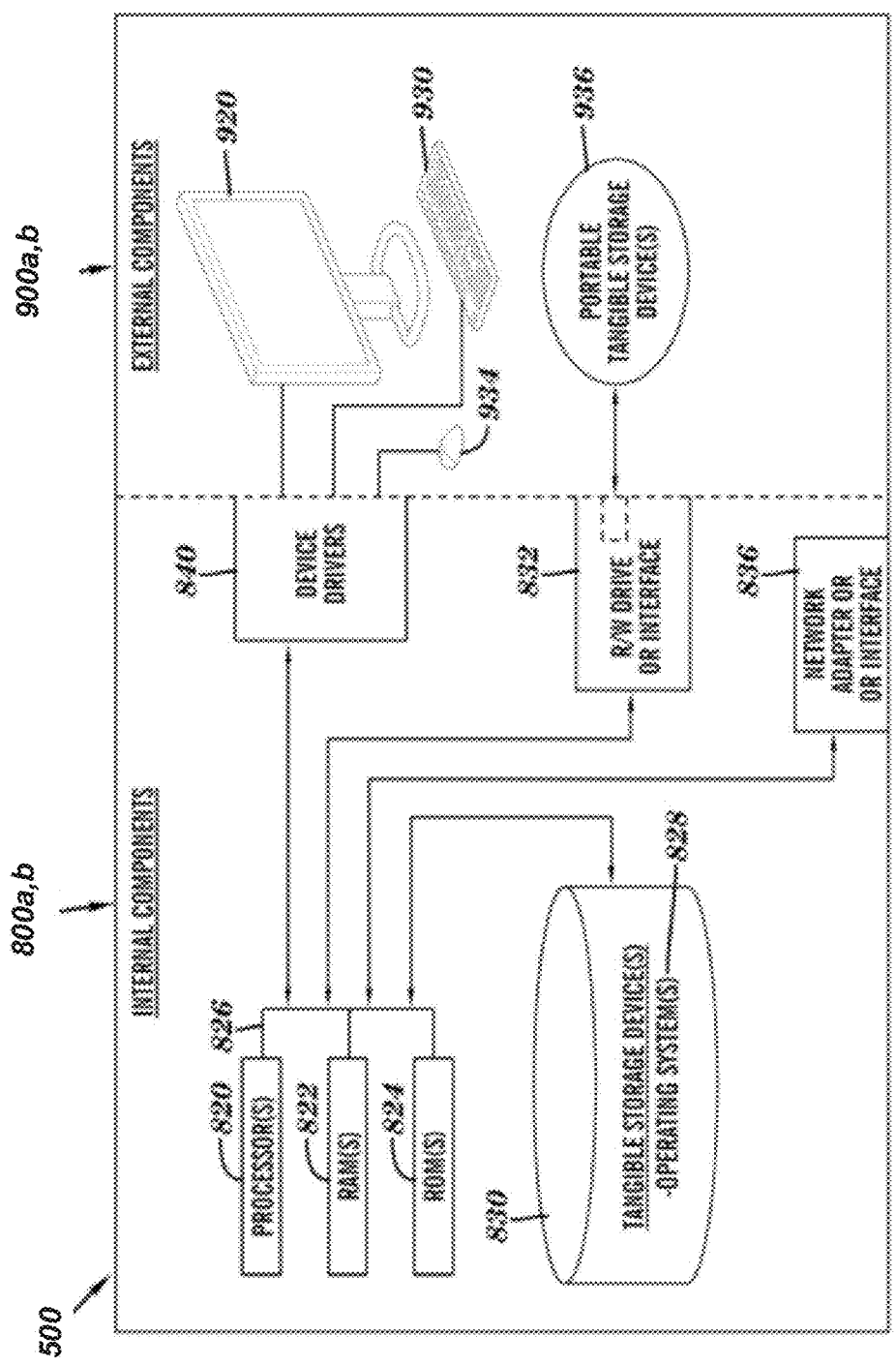
FIG. 5 is a block diagram of the system architecture of a program for modeling and analyzing online communications according to one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 5. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, the software program 114 (FIG. 1), the conversation graphing and analysis program 108A (FIG. 1) in client computer 102 (FIG. 1), and the conversation graphing and analysis program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a conversation graphing and analysis program 108A and 108B (FIG. 1), can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The conversation graphing and analysis program 108A (FIG. 1) and software program 114 (FIG. 1) in client computer 102 (FIG. 1), and the conversation graphing and analysis program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the conversation graphing and analysis program 108A (FIG. 1) and software program 114 (FIG. 1) in client computer 102 (FIG. 1) and the conversation graphing and analysis program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
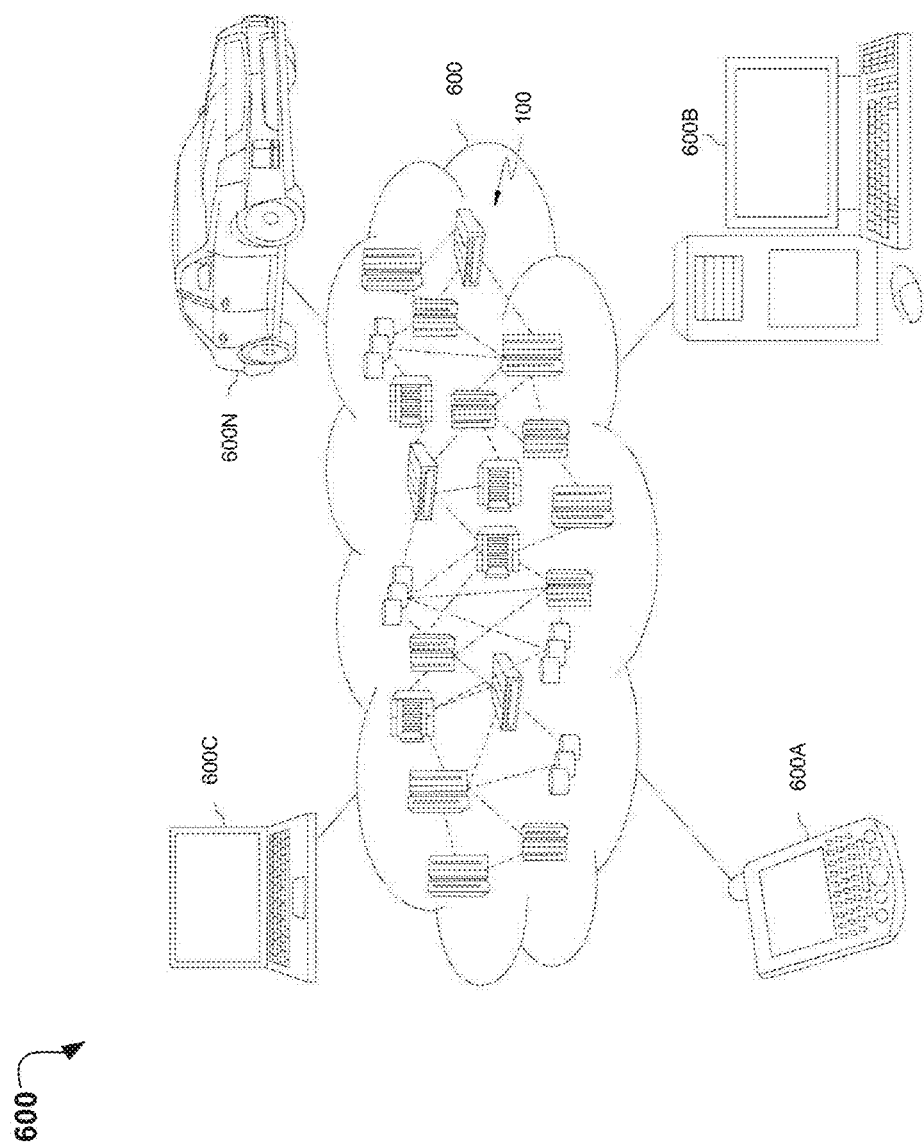
FIG. 6 is a block diagram of an illustrative cloud computing environment including the computer system depicted in FIG. 1, in accordance with an embodiment of the present disclosure.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
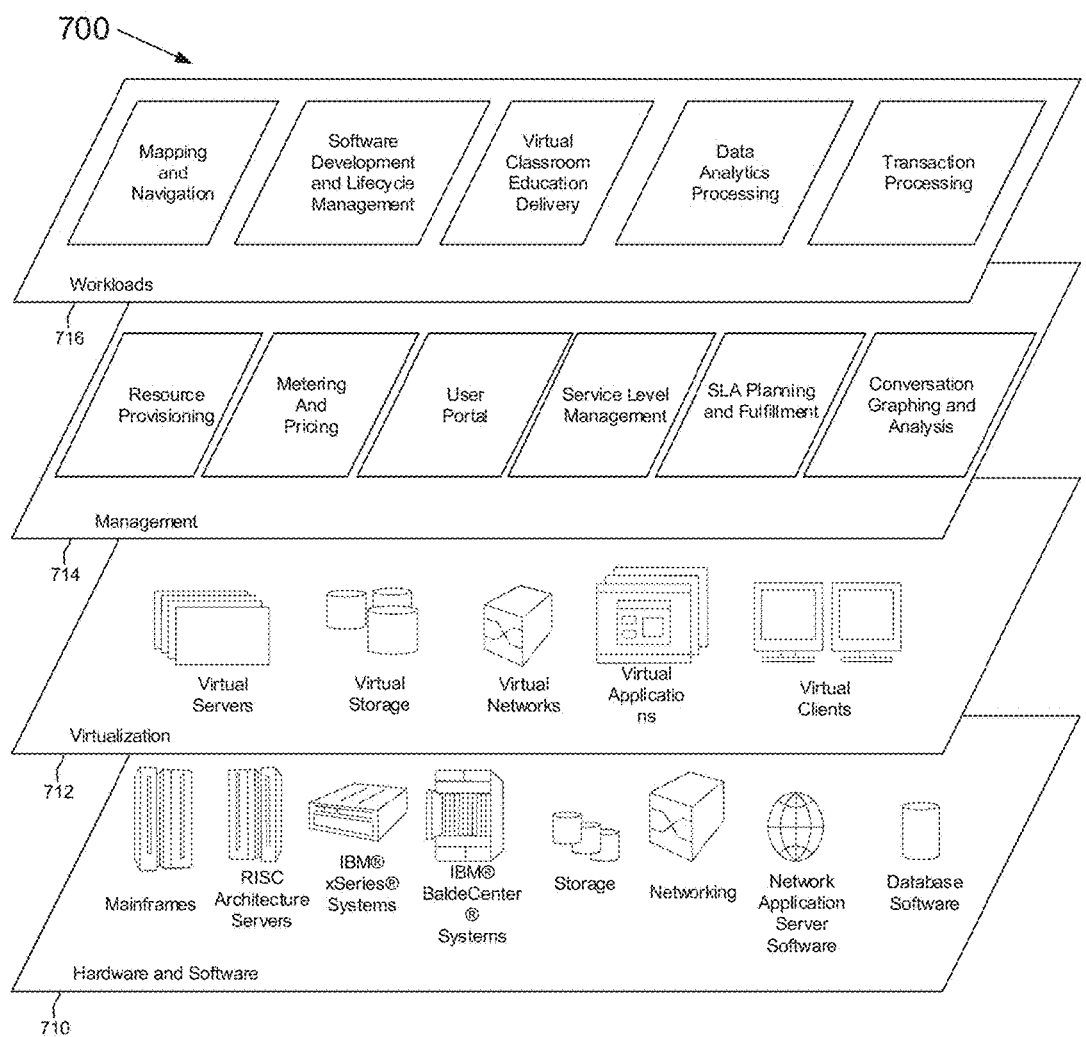
FIG. 7 is a block diagram of functional layers of the illustrative cloud computing environment of FIG. 6, in accordance with an embodiment of the present disclosure.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes; RISC (Reduced Instruction Set Computer) architecture based servers; storage devices; networks and networking components. In some embodiments, software components include network application server software.

Virtualization layer 712 provides an abstraction layer from which the following examples of virtual entities may be provided: virtual servers; virtual storage; virtual networks, including virtual private networks; virtual applications and operating systems; and virtual clients.

In one example, management layer 714 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Conversation Graphing and Analysis program may provide a method, system, and computer program product for modeling and analyzing online communications.

Workloads layer 716 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for displaying online communications associated with an online communication system, the method comprising:

detecting an online conversation associated with an online forum on the online communication system, wherein the online forum chronologically displays user posts according to the time that the user posts are posted on the online communication system;

extracting a plurality of conversation elements associated with the online conversation, wherein the extracted plurality of conversation elements comprise metadata and routing data associated with the user posts;

based on the extracted plurality of conversation elements, determining relationships between the user posts, wherein determining the relationships comprise determining whether at least one first post associated with the user posts is a reply to at least one second post associated with the user posts, and wherein determining the relationships comprises determining a terminal answer to one or more posted questions associated with the user posts;

based on the determined relationships and the extracted plurality of conversation elements, generating at least one conversation graph, wherein the generated at least one conversation graph displays the user posts according to the determined relationships between the user posts, and wherein the at least one conversation graph comprises a plurality of vertices and a plurality of edges that indicate the determined relationships between the user posts;

based on the determined relationships and an analysis of the generated at least one conversation graph, determining different sets of conversation paths and rating the different sets of conversation paths based on a plurality of factors; and displaying the generated at least one conversation graph and the rated different sets of conversation paths on the online communication system.

2. The method of claim 1, wherein the user posts are selected from a group comprising at least one of email messages, social media posts, instant messages, forum posts, and wiki posts.

3. The method of claim 1, wherein the extracted plurality of conversation elements further comprises at least one of social data and message body data.

4. The method of claim 1, wherein the plurality of factors are based on a popularity of a post associated with the user posts, a number of views associated with the user posts, and a determined length of the different sets of conversation paths.

5. A computer system for displaying online communications associated with an online communication system, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
detecting an online conversation associated with an online forum on the online communication system, wherein the online forum chronologically displays user posts according to the time that the user posts are posted on the online communication system;
extracting a plurality of conversation elements associated with the online conversation, wherein the extracted plurality of conversation elements comprise metadata and routing data associated with the user posts;
based on the extracted plurality of conversation elements, determining relationships between the user posts, wherein determining the relationships comprise determining whether at least one first post associated with the user posts is a reply to at least one second post associated with the user posts, and wherein determining the relationships comprises determining a terminal answer to one or more posted questions associated with the user posts;
based on the determined relationships and the extracted plurality of conversation elements, generating at least one conversation graph, wherein the generated at least one conversation graph displays the user posts according to the determined relationships between the user posts, and wherein the at least one conversation graph comprises a plurality of vertices and a plurality of edges that indicate the determined relationships between the user posts;
based the determined relationships and an analysis of the generated at least one conversation graph, determining different sets of conversation paths and rating the different sets of conversation paths based on a plurality of factors; and
displaying the generated at least one conversation graph and the rated different sets of conversation paths on the online communication system.

6. The computer system of claim 5, wherein the user posts are selected from a group comprising at least one of email messages, social media posts, instant messages, forum posts, and wiki posts.

7. The computer system of claim 5, wherein the extracted plurality of conversation elements further comprises at least one of social data and message body data.

8. The computer system of claim 5, wherein the plurality of factors are based on a popularity of a post associated with the user posts, a number of views associated with the user posts, and a determined length of the different sets of conversation paths.

9. A computer program product for displaying online communications associated with an online communication system, comprising:
one or more computer-readable storage devices and program instructions stored on at least one or more tangible storage devices, the program instructions executable by a processor, the program instructions comprising:
program instructions to detect an online conversation associated with an online forum on the online communication system, wherein the online forum chronologically displays user posts according to the time that the user posts are posted on the online communication system;
program instructions to extract a plurality of conversation elements associated with the online conversation, wherein the extracted plurality of conversation elements comprise metadata and routing data associated with the user posts;
program instructions to determine, based on the extracted plurality of conversation elements, relationships between the user posts, wherein determining the relationships comprise determining whether at least one first post associated with the user posts is a reply to at least one second post associated with the user posts, and wherein determining the relationships comprises determining a terminal answer to one or more posted questions associated with the user posts;
program instructions to generate, based on the determined relationships and the extracted plurality of conversation elements, at least one conversation graph, wherein the generated at least one conversation graph displays the user posts according to the determined relationships between the user posts, and wherein the at least one conversation graph comprises a plurality of vertices and a plurality of edges that indicate the determined relationships between the user posts;
program instructions to determine, based the determined relationships and an analysis of the generated at least one conversation graph, different sets of conversation paths, and program instructions to rate the different sets of conversation paths based on a plurality of factors; and
displaying the generated at least one conversation graph and the rated different sets of conversation paths on the online communication system.

10. The computer program product of claim 9, wherein the user posts are selected from a group comprising at least one of email messages, social media posts, instant messages, forum posts, and wiki posts.

11. The computer program product of claim 9, wherein the extracted plurality of conversation elements further comprises at least one of social data and message body data routing data, social data, metadata, and message body data.

12. The computer program product of claim 9, wherein the plurality of factors are based on a popularity of a post associated with the user posts, a number of views associated with the user posts, and a determined length of the different sets of conversation paths.

\* \* \* \* \*